(No Model.)
W. R. CAMPBELL & W. J. CHAMBERS.
CORN PLANTER CHECK ROWER.
No. 263,854. Patented Sept. 5, 1882.
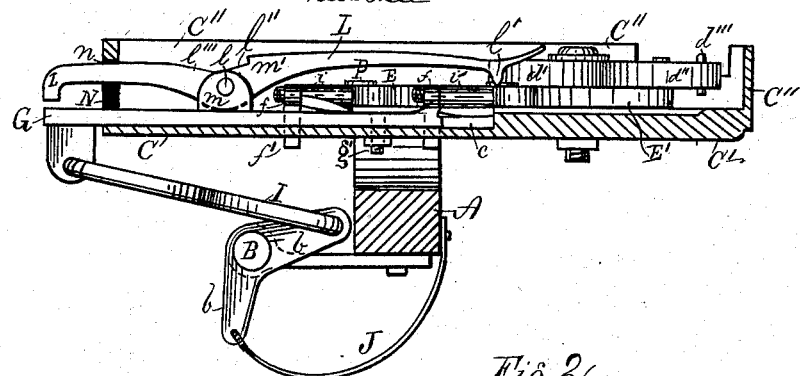
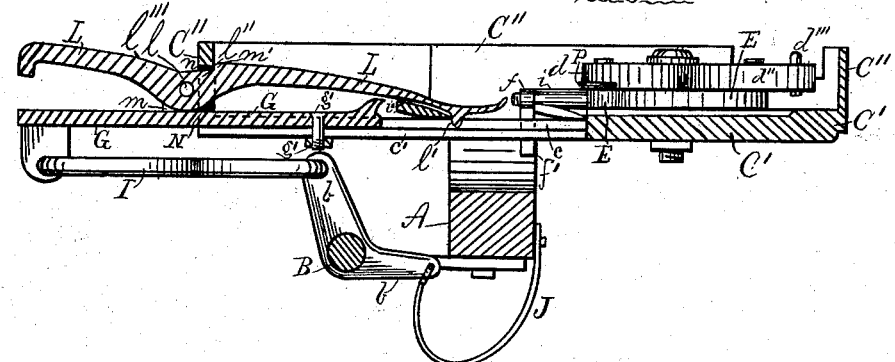
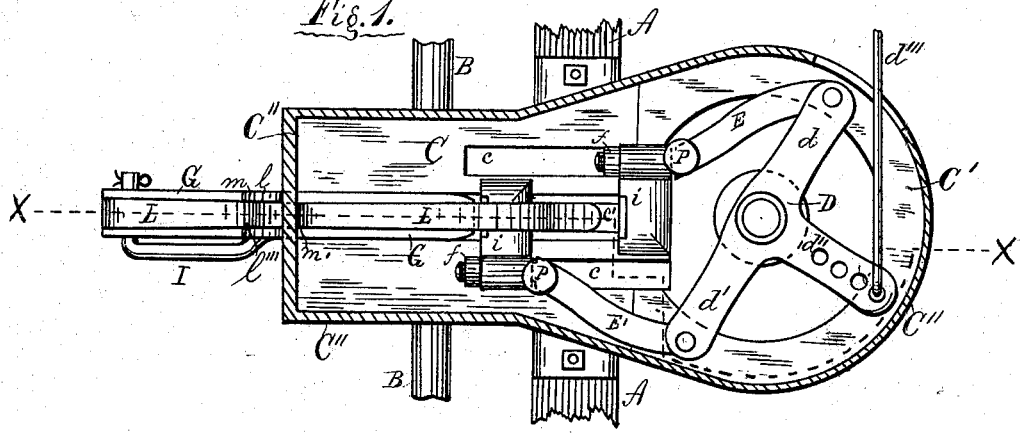
Witnesses.
P. R. Richards.
Calvin Henson.
Inventors.
William R. Campbell,
William J. Chambers,
By W. P. Richards,
Atty.

UNITED STATES PATENT OFFICE.

WILLIAM R. CAMPBELL AND WILLIAM J. CHAMBERS, OF KIRKWOOD, ILL.

CORN-PLANTER CHECK-ROWER.

SPECIFICATION forming part of Letters Patent No. 263,854, dated September 5, 1882.

Application filed March 29, 1882. (No model.)

*To all whom it may concern:*

Be it known that we, WILLIAM R. CAMPBELL and WILLIAM J. CHAMBERS, citizens of the United States, residing near Kirkwood, in the county of Warren and State of Illinois, have invented certain new and useful Improvements in Corn - Planter Check - Rowers; and we do hereby declare the following to be a full, clear, and exact description of the invention, such as will enable others skilled in the art to which it appertains to make and use the same.

Our present invention relates to improvements in the corn-planter check-rower for which Letters Patent of the United States, No. 251,830, were granted to us January 3, 1882; and it consists in the use of a lock-bar which is operated by said check-row devices and combined therewith, for the purpose of securing the seed-slides against accidental movement during the intervals of rest, while the tappets on the tappet wire or cord are not engaged with the forked lever, as hereinafter described and claimed.

In the accompanying drawings, which illustrate our invention and a device embodying the same, and form a part of this specification, Figure 1 is a top plan; Fig. 2, an elevation partly in section in the line $x\ x$ in Fig. 1; Fig. 3, a side elevation, the parts in different relative positions from that shown at Figs. 1 and 2.

Referring to the drawings by letters—the same letter indicating the same part in the different figures, and the same letter used to indicate any particular part in our aforesaid patent being also used herein to indicate the same part—letter A represents the supporting-bar; B, the rock-shaft; C, the base-plate, with slots $c\ c\ c'$ and enlarged end $C'$; D, oscillating head, with arms $d\ d'\ d''$, arm $d''$ with holes from which rod $d'''$ extends to seed slide-bar; E E', arms hinged to arms $d\ d'$, respectively, and having lugs $i\ i'$ hinged to their respective ends and held by nuts $f$, which nuts have lugs $f'$ extending downward into the slots $c$. G is a tappet-bar, which has a reciprocating endwise movement from the rock-shaft B, arm $b$, and connecting-rod I, and is held in line by a lug, $g'$, which moves in slot $c'$. J is a spring adapted to return the shaft B to its original position after each movement from the tappets acting on the forked levers on each end of said shaft.

The foregoing parts described by letter are constructed substantially the same and operate in combination in same manner as shown and fully described in our aforesaid patent, and need not be fully described here.

In our present device we have preferred to inclose the working parts by a surrounding wall, C'', and a top or cover thereon, the drawings showing the device with the cap or cover removed.

L is a lock-bar hinged or pivoted at $l$ to lugs or ears $m$, which project upwardly from the sliding tappet G, so as to slide endwise with the bar G. The bar L has a catch, $l'$, projecting downwardly from its front end, and is somewhat concave on its under side from the catch $l'$ to the fulcrum $l$, and is formed at its rear end and under side so as to permit of it oscillating to a limited extent in a vertical plane on the fulcrum $l$. The upper side of the bar L is formed with a cam-face, $l''$, extending from near the fulcrum $l$ forward and slightly upward, and with a cam-face, $l'''$, extending from near said fulcrum rearward and slightly upward, as shown at Figs. 2 and 3. The cam-face $l''$ is preferably terminated at its forward end by a shoulder, $m'$. N is a slot in the wall C'', through which the bars G and L pass.

As shown at Figs. 2 and 3, the bar G, moved by a tappet on the tappet-wire, has acted on the lug $i'$ and moved the parts into the relative positions shown at said figures, and the bar G has been retracted by the spring J into the position shown at same figures and ready for action on the lug $i$ at its next forward movement. In moving backward by the action of the spring, as last described, the cam-face $l''$ comes in contact with the upper side, $n$, of the slot N, and the forward end of the bar L is thereby forced downward, so that the catch $l'$ is brought down in front of the lug $i$, as shown at Fig. 2, in which position it holds the bars E E' and head D firmly in position, and thereby prevents the seed-slide from being moved by any accidental movement or inclined position of the planter during the intervals while the tappets are not engaged with the lever on shaft B. The action of the lock-bar L on the lug $i'$ at the next throw of the bar G is the same as its action with reference to the lug $i$, and need not be described here. As the bar G and lock-bar are thrust forward by the action of the tappets on the forked lever the cam-face $l'''$ will come in contact with the upper side of the slot N, and the forward end of the bar L will be thereby elevated, as shown at Fig. 3, to permit the lugs $i\ i'$ to pass beneath the catch $l'$.

It will be evident that any fixed wiper may be used instead of the upper side of the slot N to oscillate the bar L. The bar L has to a limited extent the same function in preventing the lugs $i\ i'$ swinging over as does the spring-bar H in our aforesaid patent; but we prefer using a button, P, attached to each arm E E', so as to extend over the hinged end of its connected lug $i$ or $i'$ in a manner to permit the lug to swing the extent required, but no farther. The shoulder $m'$ on the bar L will come in contact with the wall of the case $C''$, as shown at Fig. 2, and thus act as a stop to limit the movement or throw of the bar G by the spring J.

What we claim as new is—

1. In a corn-planter check-rower, the combination, with an oscillating head, D, having arms E E' hinged thereto, adapted to be actuated by a sliding bar, G, of a bar, L, hinged to said bar G and adapted to be rocked or swung on its fulcrum, whereby a catch on its end may engage and lock the parts, substantially as and for the purpose specified.

2. In a corn-planter check-rower, the combination, with an oscillating head, D, having arms E E' hinged thereto, adapted to be actuated by a sliding bar, G, of a bar, L, hinged to said bar G and having cam-faces $l''\ l'''$, which slide in contact with the side $n$ of a slot, N, to oscillate said bar L for the purpose of engaging and disengaging a catch, $l'$, on its end with the arms E E' alternately, substantially as and for the purpose specified.

3. In a corn-planter check-rower, the combination, with the head D, having arms E E' hinged thereto, which arms E E' have lugs $i\ i'$, respectively hinged thereto, and a sliding bar, G, of an oscillating bar, L, hinged to the bar G and provided with cam-faces $l''\ l'''$ and a catch, $l'$, and adapted to be oscillated by a fixed part, $n$, substantially as and for the purpose specified.

4. In combination with the head D, arms E E', swinging lugs $i\ i'$, and sliding tappet-bar G, adapted to impart movement alternately to the lugs $i\ i'$, the oscillating bar L, hinged to the bar G and adapted to be operated and to lock the parts, substantially as and for the purpose specified.

5. In combination with the head D, arms E E', swinging lugs $i\ i'$, and sliding tappet-bar G, rock-shaft B and connecting-rod I, adapted to impart movement alternately to the lugs $i\ i'$, the oscillating bar L, hinged to the bar G and adapted to be operated and lock the parts, substantially as and for the purpose specified.

6. In combination with the head D, bars E E', lugs $i\ i'$, and sliding bar G, the oscillating bar L, having catch $l'$ and cam-faces $l''\ l'''$, and shoulder $m'$, adapted to engage with the wall $C''$ and limit the throw of the slide G in one direction, substantially as and for the purpose specified.

7. In combination with the sliding tappet-bar G, swinging lugs $i\ i'$, and sliding arms E E', the guard-buttons P, adapted to limit the extent of swinging movement of the lugs $i\ i'$, substantially as and for the purpose specified.

In testimony whereof we affix our signatures in presence of two witnesses.

WILLIAM R. CAMPBELL.
WILLIAM J. CHAMBERS.

Witnesses:
ALEXANDER S. UMBERGER,
JOHN J. SEERLEY.